United States Patent [19]
von Froreich

[11] Patent Number: 5,657,856
[45] Date of Patent: Aug. 19, 1997

[54] CONVEYOR SYSTEM, PARTICULARLY FOR MATERIAL CARRIERS FOR USE IN MEDICAL LABORATORIES

[76] Inventor: André von Froreich, Forsthöhe 33, D-21149 Hamburg, Germany

[21] Appl. No.: 528,938

[22] Filed: Sep. 15, 1995

[30] Foreign Application Priority Data

Sep. 28, 1994 [DE] Germany .................. 44 34 714.6

[51] Int. Cl.$^6$ .................................................. B65G 15/10
[52] U.S. Cl. ................ 198/817; 198/803.01; 198/465.2; 198/841
[58] Field of Search ................ 198/465.1, 465.2, 198/802, 803.01, 817, 602, 606, 831, 832, 841, 860.2, 580, 583

[56] References Cited

U.S. PATENT DOCUMENTS

| | | |
|---|---|---|
| 1,476,936 | 12/1923 | Walden . |
| 3,583,325 | 6/1971 | Melin . |
| 4,217,977 | 8/1980 | Tam .................. 198/817 X |
| 4,230,223 | 10/1980 | Flajnik .................. 198/817 |
| 5,074,401 | 12/1991 | Morita et al. ............ 198/803.01 X |
| 5,203,446 | 4/1993 | Ufland .................. 198/465.2 |
| 5,244,079 | 9/1993 | Osamu .................. 198/803.01 X |

FOREIGN PATENT DOCUMENTS

| | | |
|---|---|---|
| 1559786 | 1/1968 | France . |
| 2622876 | 5/1989 | France . |
| 1584561 | 2/1970 | Germany . |
| 3518134 | 11/1986 | Germany . |
| 287294 | 11/1927 | United Kingdom . |
| 9113013 | 9/1991 | WIPO . |

*Primary Examiner*—James R. Bidwell
*Attorney, Agent, or Firm*—Friedrich Kueffner

[57] ABSTRACT

A conveyor system, particularly for material carriers for use in medical laboratories, includes two endless motor-driven round belts which are guided in the conveying area in a horizontal plane parallel to each other and in the same direction. The conveyor belts are guided on components which extend in conveying direction and have upwardly extending side walls. At the beginning and the end of a conveying path, the conveyor belts are guided around deflection rollers. The conveying path is composed of at least two segments each having two conveyor belts which are guided at segment transfer points over deflection rollers, wherein the deflection rollers of adjacent segments located opposite each other are connected by at least one transfer belt.

10 Claims, 3 Drawing Sheets

CONVEYOR SYSTEM, PARTICULARLY FOR MATERIAL CARRIERS FOR USE IN MEDICAL LABORATORIES

BACKGROUND OF THE INVENTION

1. Field of the Invention

The present invention relates to a conveyor system, particularly for material carriers for use in medical laboratories. The conveyor system includes two endless motor-driven round belts which are guided in the conveying area in a horizontal plane parallel to each other and in the same direction. The conveyor belts are guided on components which extend in conveying direction and have upwardly extending side walls. At the beginning and the end of a conveying distance, the conveyor belts are guided around deflection rollers.

2. Description of the Related Art

Various very different conveyor systems are known in the art. The conveyor system according to the present invention is a conveyor system in which the two endless conveyor belts having a circular cross-section are guided parallel to each other in a plane in a circuit and, thus, form a forward conveying distance and a rearward conveying distance which are both available for conveying material carriers in a circuit. The conveyor belts are preferably guided by the oppositely extending side walls, so that the conveyor belts do not leave the conveying path.

Conveyor systems of this type cannot be constructed with any desired length. Because of the structural requirements, material properties, drive problems and guidance problems, the length and, thus, the available conveying distance are limited. In addition, there are cases in which conveying distances of different lengths are required.

SUMMARY OF THE INVENTION

Therefore, it is the primary object of the present invention to provide a conveyor system of the above-described type which makes longer conveying distances possible and which, simultaneously, is of modular construction.

In accordance with the present invention, the conveying path is composed of at least two segments each having two conveyor belts which are guided at segment transfer points over deflection rollers, wherein the deflection rollers of adjacent segments located opposite each other are connected by means of at least one transfer belt.

Accordingly, the present invention provides that two or more segments are combined, wherein each segment has two endless conveyor belts, and wherein the segments abut each other and are connected to each other only at the transition points. The connection is effected by guiding the conveyor belts over special deflection rollers which simultaneously serve to guide the short transfer belts. Accordingly, it is possible to arrange as many segments as desired one behind the other in order to form a conveying distance of appropriate length. The transfer belts ensure a safe transfer at the segment transfer points.

In accordance with a feature of the present invention, the transfer belts are guided in a positively engaging or frictionally engaging manner on the deflection rollers. As a result, the transfer belts ensure that the speeds of the conveyors which are connected to each other are synchronized.

The transfer belts may be constructed as toothed belts. Also, the transfer belts may have an essentially circular cross-section. Always two of the transfer belts with circular cross-section may be guided over the deflection rollers to be connected.

If a synchronization of the speeds and possibly a common drive of the segments connected to each other by the transfer belts is not desired, it is possible to provide a freewheel for uncoupling the guide rollers over which a common transfer belt is guided. In that case, it is possible, for example, to increase the speed of the segment following in conveying direction and to space the material carriers farther apart from each other and to convey the material carriers more quickly.

In accordance with a particularly advantageous feature of the present invention, the deflection rollers at the segment transfer points rotate about essentially horizontally extending axes and the two conveyor belts are guided downwardly. The horizontal arrangement of the axes of the deflection rollers makes it possible to guide the conveyor belts downwardly where they can be guided to the adjacent conveying path. A particularly compact construction is achieved if the downwardly guided conveyor belts are guided underneath the adjacent conveying paths by means of large rollers which rotate about axes extending essentially in vertical direction. Preferably, the axes of the large rollers are slightly inclined.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
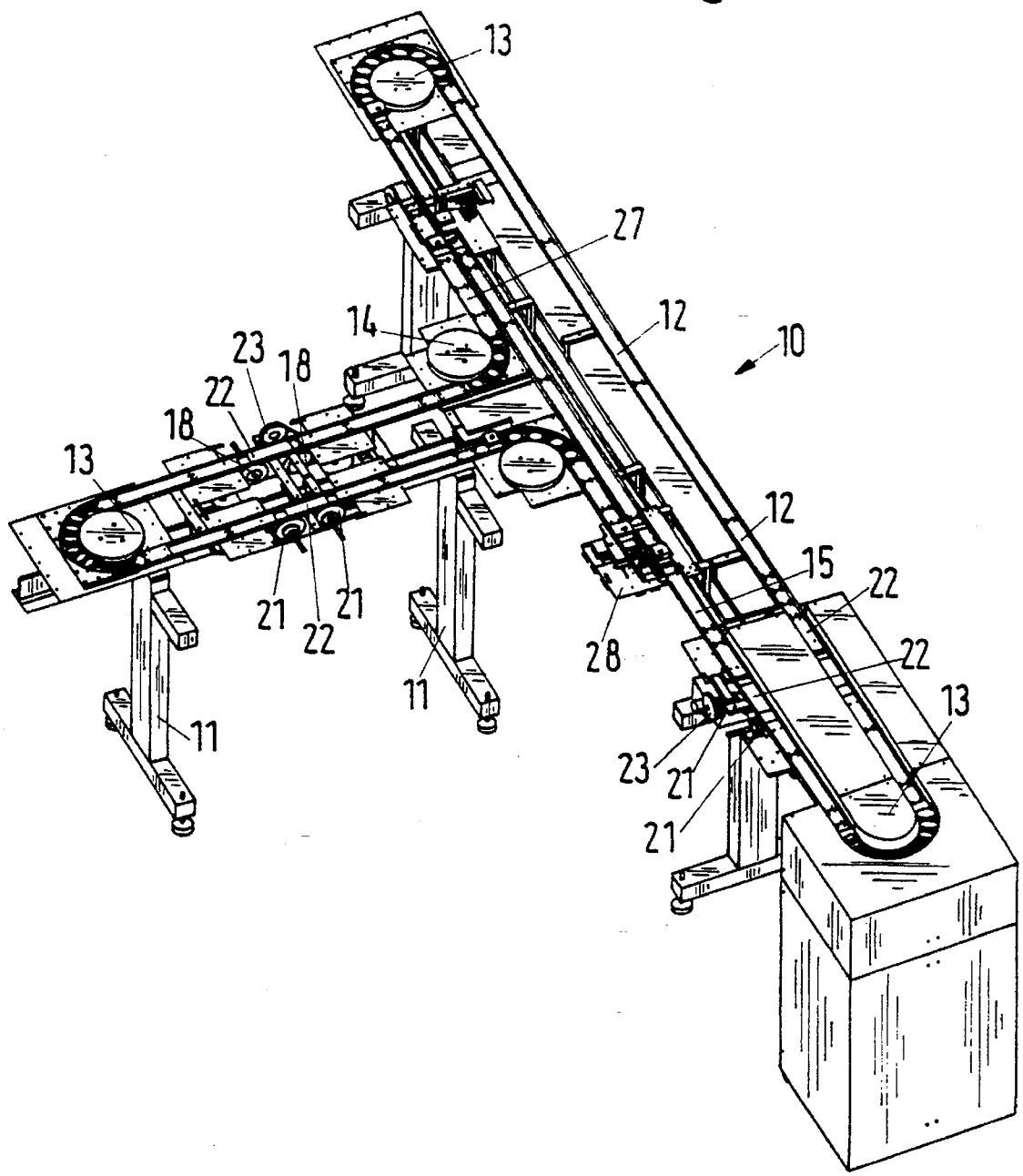
FIG. 1 is a perspective view of the conveyor system according to the present invention.

FIG. 1 of the drawing shows a conveyor system 10 according to the present invention. The conveyor system 10 rests on a frame or a stand 11 and is composed of individual straight segments 12, 180° turns 13 and 90° bends 14. As a result of this modular construction, the conveyor system 10 can be constructed in almost any desired configuration. The conveyor system 10 is guided in a circuit, so that the objects being conveyed travel through treatment stations and are returned to their initial locations.

Figure 2:
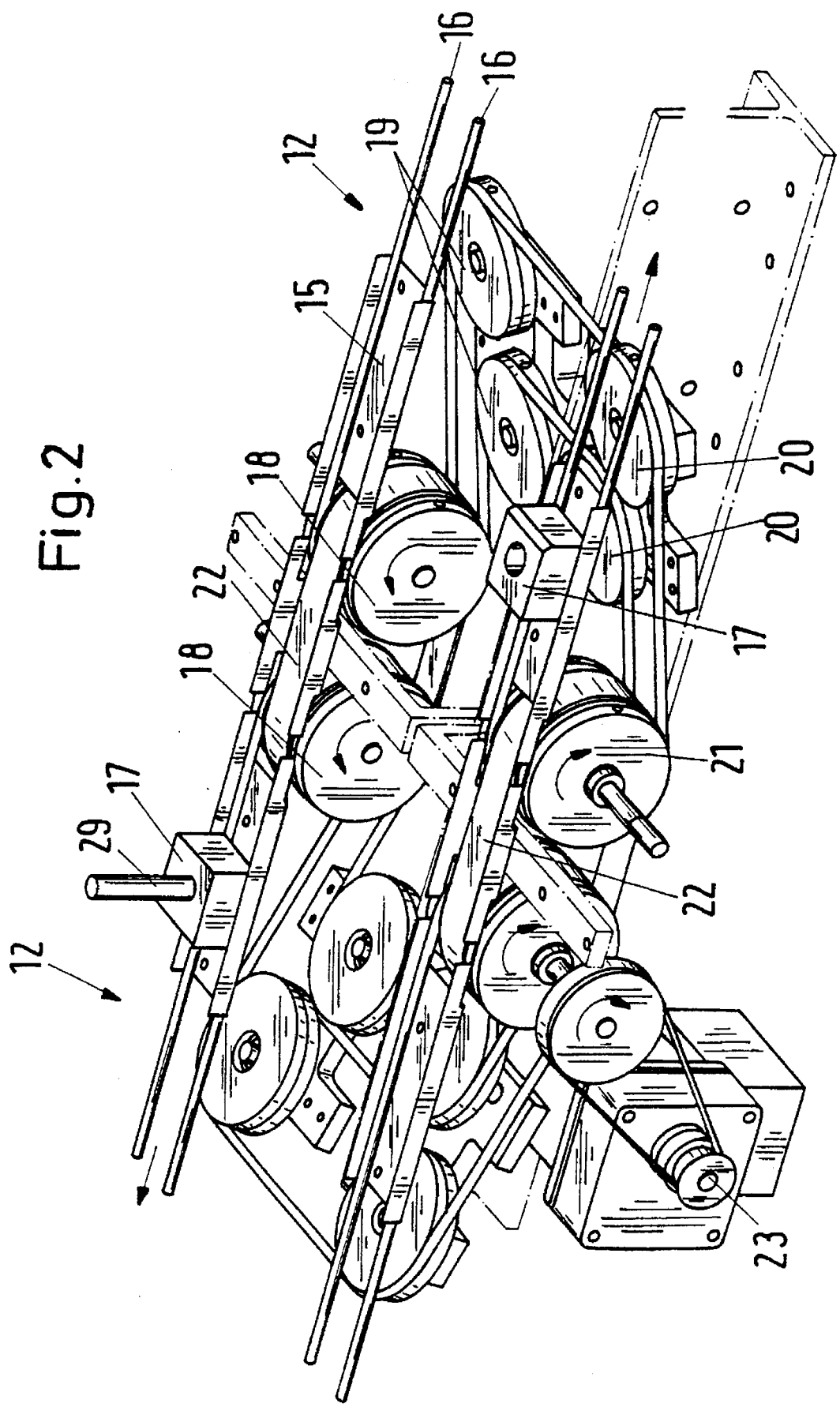
FIG. 2 is a perspective view, on a larger scale, of a detail of the conveyor system of FIG. 1.

The conveyor system shall now be explained in more detail with the aid of FIG. 2 which shows, on a larger scale, a point where two straight segments 12 abut each other. The conveying path 15 is formed by an essentially U-shaped sheet metal, wherein essentially round elastic belts 16 are guided along the lower side edges of the sheet metal. An essentially tube-shaped material carrier 17 is placed on the belt 16 and is conveyed in the conveying direction indicated by an arrow in FIG. 2, wherein the sides of the U-shaped conveying path 15 serves to laterally guide the material carrier.

The belts 16 are preferably composed of a thermoplastic polyurethane. The individual straight segments 12 have an individual belt guidance. The belts 16 are deflected at each end of the segment, wherein the pair of belts 16 traveling towards the end of the segment are deflected vertically downwardly by large deflection rollers 18 and are conducted from there in horizontal direction underneath the adjacent conveying path 15 by means of inclined large rollers 19. Two pairs of rollers 20 then carry out an analogous deflection in horizontal direction and pairs of large rollers 21 carry out a deflection in vertical direction in order to conduct the pair of belts into the opposite conveying direction. Accordingly, both portions of each conveyor belt 16 are utilized for conveying.

The relatively large rollers have been found particularly advantageous because they minimize the load acting on the belts due to deformations and, thus, minimize the driving force. The arrangement of the horizontally deflecting rollers 19, 20 significantly minimizes the tendency to slippage. The inclined position of the horizontally deflecting rollers 19, 20 reduces the structural size and adapts to a given spacing of a stable carrier system.

The continuous further conveyance of the material carriers 17 between the pairs of belts of individual segments is effected by means of wide toothed belts 22. At desired locations, the toothed belts 22 can be used for transmitting additional drive moments. As a result, it is possible to drive two segments 12 directly with only one drive 23. At transition points where the transmission of torque represents an obstacle, the transition point is uncoupled by a freewheeling mounting of a deflection roller of each wide toothed belt 22.

Figure 3:
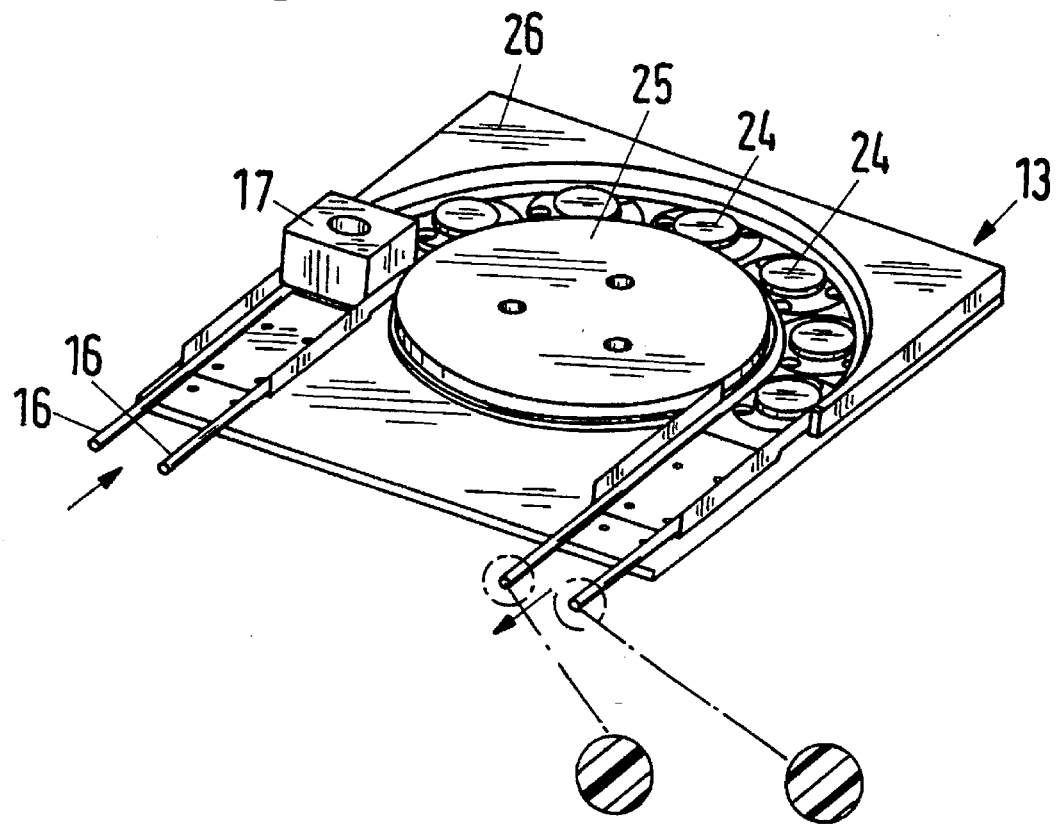
FIG. 3 is a partial perspective view of a belt deflection by 180°.

A winding conveying path in the horizontal plane is achieved by deflecting the belts 16 at rollers 24, 25. The rollers 24, 25 have a width which does not protrude above the thickness of the belts. FIG. 3 shows a segment 13 in which the conveyor belt pair 16 is deflected by 180°. A large roller 25 serves to deflect the inner belt. The large roller 25 has a circumferential groove for guiding the belt and has an axial extension which is smaller than the diameter of the belt, so that the material carrier rests on the belt also in the curved area. As FIG. 3 also shows, several rollers of smaller diameter are provided for deflecting the outer belt. Structurally, the rollers 24 correspond to the large roller 25. The large roller 25 could also be replaced by a number of several smaller rollers. A shoulder of a curved element 26 adapted to the curvature of the belt serves for the lateral guidance of the material carrier 17.

Figure 4:
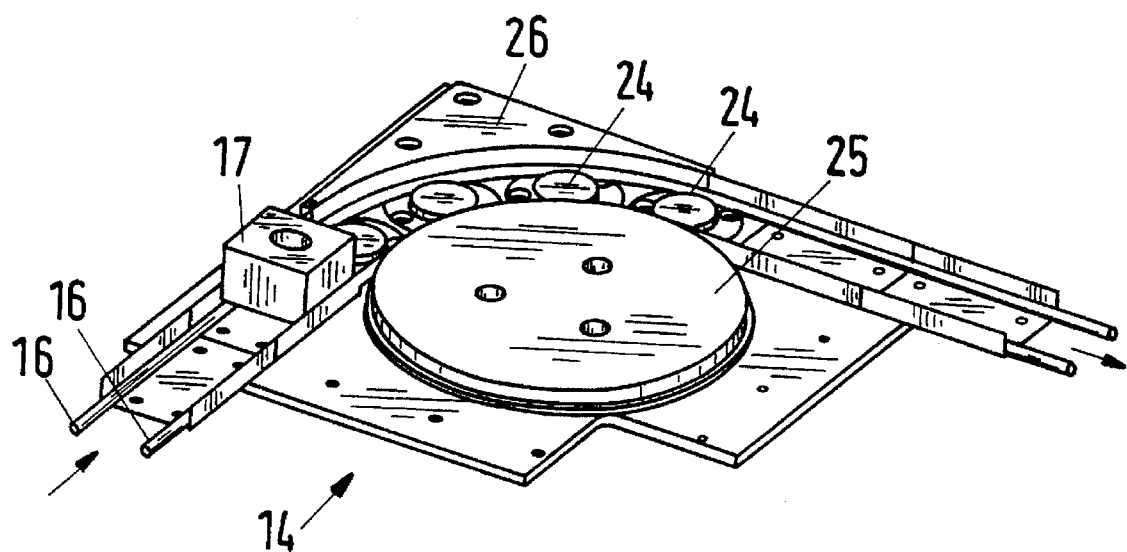
FIG. 4 is a partial perspective view of a belt deflection by 90°.

An example for the deflection of the pair of belts 16 by 90° is shown in FIG. 4. Also in this case, a large roller 25 serves to deflect the inner belt. Several smaller rollers 24 are provided for the deflection of the outer belt. The construction of the rollers 24 and 25 of the segment 14 corresponds to that of the segment 13. The segment 14 also has a curved element 26 whose shoulder serves to laterally guide the material carrier 17.

FIG. 1 schematically illustrates an additional conveying path 27 which extends parallel along a portion of the conveying path 15. Predetermined material carriers 17 can be pushed from the conveying path 15 onto the conveying path 27 by means of a switch 28. This makes it possible to convey these predetermined material carriers to other or additional locations.

The material carriers 17 are essentially cube-shaped and, in accordance with the illustrated embodiment, have a center opening which serves, for example, for receiving a test tube 29. The material carrier 17 has on its bottom side a coding, wherein, in the area approaching the switch, the identification of the material carrier is carried out by means of initiators or proximity switches arranged transversely of the travel direction. Accordingly, the actuation of the switch is effected in dependence on the respective coding of the material carrier. The material carrier is denoted by reference numeral 17 and a test tube received by the material carrier is denoted by reference numeral 29.

In the embodiment described above and illustrated in FIG. 1, a segment transfer point as it is illustrated in detail in FIG. 2 is provided once in the conveying path 27 and once in the conveying path 15. Details of the segment transfer point in the conveying path 15 are covered by a piece of sheet metal and cannot be recognized. This piece of sheet metal is not present in the segment transfer point in the conveying path 27.

In accordance with another embodiment, it is possible to provide, instead of the toothed belts 22, several round belts as transfer belts which extend parallel to each other and are driven merely by the friction occurring between the deflection rollers 18, 18 or 21, 21. Appropriate circumferential grooves are provided in the deflection rollers for guiding the transfer belts.

The transfer belts serve to transfer material carriers from one segment to the next. They may additionally serve the purpose of synchronizing the speeds of the conveyor belts and even to transmit the driving force from one segment to the other. However, this is not required. Each segment may be driven separately and with different speeds in accordance with individual requirements.

While specific embodiments of the invention have been shown and described in detail to illustrate the inventive principles, it will be understood that the invention may be embodied otherwise without departing from such principles.

I claim:

1. A conveyor system particularly for material carriers for use in medical laboratories, the conveyor system comprising a conveying path comprising components having upwardly extending side walls, the conveying path having a beginning and an end, two endless conveyor belts being guided parallel to each other in a horizontal plane and driven by a motor in the same direction on the components, the conveying belts being guided around first deflection rollers at the beginning and at the end of the conveying path, the conveying path comprising at least two segments each having two conveyor belts guided on the components, the at least two segments abutting each other in a segment transfer point, second deflection rollers for the conveyor belts being mounted on each segment at the segment transfer point, further comprising transfer belts connecting the second deflection rollers of abutting segments.

2. The conveyor system according to claim 1, wherein the second deflection rollers at the segment transfer point are mounted so as to rotate about essentially horizontally extending axes, and wherein the conveyor belts are guided on the second deflection rollers so as to travel downwardly from the conveying path.

3. The conveyor system according to claim 2, further comprising large rollers for guiding the downwardly traveling conveyor belts toward an adjacent conveyor path, wherein the large rollers are mounted so as to rotate about axes which extend essentially vertically.

4. The conveyor system according to claim 3, wherein the axes of the large rollers are slightly inclined.

5. The conveyor system according to claim 1, wherein the transfer belts are guided on the second deflection rollers in a positively engaging or frictionally engaging manner.

6. The conveyor system according to claim 5, wherein the transfer belts are toothed belts.

7. The conveyor system according to claim 5, wherein the transfer belts have an essentially circular cross-section.

8. The conveyor system according to claim 7, wherein each transfer belt comprises two belts having circular cross-sections.

9. The conveyor system according to claim 5, further comprising a freewheel for uncoupling one of the second deflection rollers of a pair of deflection rollers connected by one of the transfer belts.

10. The conveyor system according to claim 1, wherein the two conveyor-belts include an inner conveyor belt and an outer conveyor belt at the beginning and at the end of the conveying path, comprising a large roller for guiding the inner conveyor and a plurality of smaller rollers for guiding the outer conveyor belt, wherein the large roller and the smaller rollers have a width and each conveyor belt has a diameter, and wherein the large roller and the smaller rollers are located in a plane and the width of the larger rollers and the smaller rollers is smaller than the diameter of the conveyor belt.

* * * * *